(12) United States Patent
Chang et al.

(10) Patent No.: US 8,179,383 B2
(45) Date of Patent: May 15, 2012

(54) TOUCH SCREEN

(75) Inventors: Jung-Wen Chang, Tao Yuan Shien (TW); Wen-Ji Tsai, Taipei County (TW); Wan-Chi Lin, Taichung (TW); Chih-Hsien Wu, Changhua County (TW)

(73) Assignee: Quanta Computer Inc., Tao Yuan Shien (TW)

( * ) Notice: Subject to any disclaimer, the term of this patent is extended or adjusted under 35 U.S.C. 154(b) by 405 days.

(21) Appl. No.: 12/402,678

(22) Filed: Mar. 12, 2009

(65) Prior Publication Data

US 2010/0177052 A1    Jul. 15, 2010

(30) Foreign Application Priority Data

Jan. 9, 2009   (TW) ............................... 98200301 U

(51) Int. Cl.
    *G06F 3/042* (2006.01)
(52) U.S. Cl. ....................................... 345/175
(58) Field of Classification Search ........................ None
    See application file for complete search history.

(56) References Cited

U.S. PATENT DOCUMENTS

| | | | |
|---|---|---|---|
| 4,507,557 A | | 3/1985 | Tsikos |
| 4,746,770 A | * | 5/1988 | McAvinney ............... 178/18.09 |
| 5,162,783 A | * | 11/1992 | Moreno ......................... 345/175 |
| 6,480,187 B1 | | 11/2002 | Sano et al. |
| 7,202,860 B2 | | 4/2007 | Ogawa |
| 2005/0231900 A1 | * | 10/2005 | Homer ........................... 361/683 |
| 2007/0089915 A1 | | 4/2007 | Ogawa et al. |
| 2008/0259053 A1 | | 10/2008 | Newton |
| 2009/0213094 A1 | * | 8/2009 | Bridger ......................... 345/175 |
| 2010/0110005 A1 | * | 5/2010 | Chtchetinine et al. ........ 345/158 |

* cited by examiner

*Primary Examiner* — Wayne Young
*Assistant Examiner* — Brian Butcher
(74) *Attorney, Agent, or Firm* — Thomas|Kayden

(57) ABSTRACT

The present application provides a touch screen including a panel module, an image sensor module, and a bezel surrounding the panel module. The image sensor module includes a circuit board and an image sensor unit electrically connected thereto, and both are disposed on the panel module. The image sensor unit has an image sensing surface substantially perpendicular to the circuit board for object detection on a display surface of the panel module.

13 Claims, 5 Drawing Sheets

TOUCH SCREEN

CROSS REFERENCE TO RELATED APPLICATIONS

This Application claims priority of Taiwan Patent Application No. 98200301, filed on Jan. 9, 2009, the entirety of which is incorporated by reference herein.

TECHNICAL FIELD

The invention relates in general to a touch screen and in particular to a touch screen applying optical imaging technology.

DESCRIPTION OF THE RELATED ART

Touch screens have been applied as significant human interfaces for consumer electronic devices. There are a number of types of conventional touch screen sensing technologies including resistive, capacitive, infrared, ultrasound, and optical imaging. Referring to FIG. 1, a touch screen D applying optical imaging sensing technology comprises two image sensor modules S disposed at two adjacent corners thereof. When the user touches the display surface D1 with fingers or puts an object thereon, the image sensor modules S captures images of the fingers or the object, so as to calculate a position coordinate P(X,Y) on the display surface D1 thereof. Since the image sensor module S usually has considerable dimensions, this may increase thickness of the touch screen and difficulties for miniaturization.

BRIEF SUMMARY

The present application provides a touch screen including a panel module, an image sensor module, and a bezel surrounding the panel module. The image sensor module includes a circuit board and an image sensor unit electrically connected thereto, and both are disposed on the panel module. The image sensor unit has an image sensing surface substantially perpendicular to the circuit board for object detection on a display surface of the panel module.

BRIEF DESCRIPTION OF DRAWINGS

The application can be more fully understood by reading the subsequent detailed description and examples with references made to the accompanying drawings, wherein.

DETAILED DESCRIPTION

Figure 1:
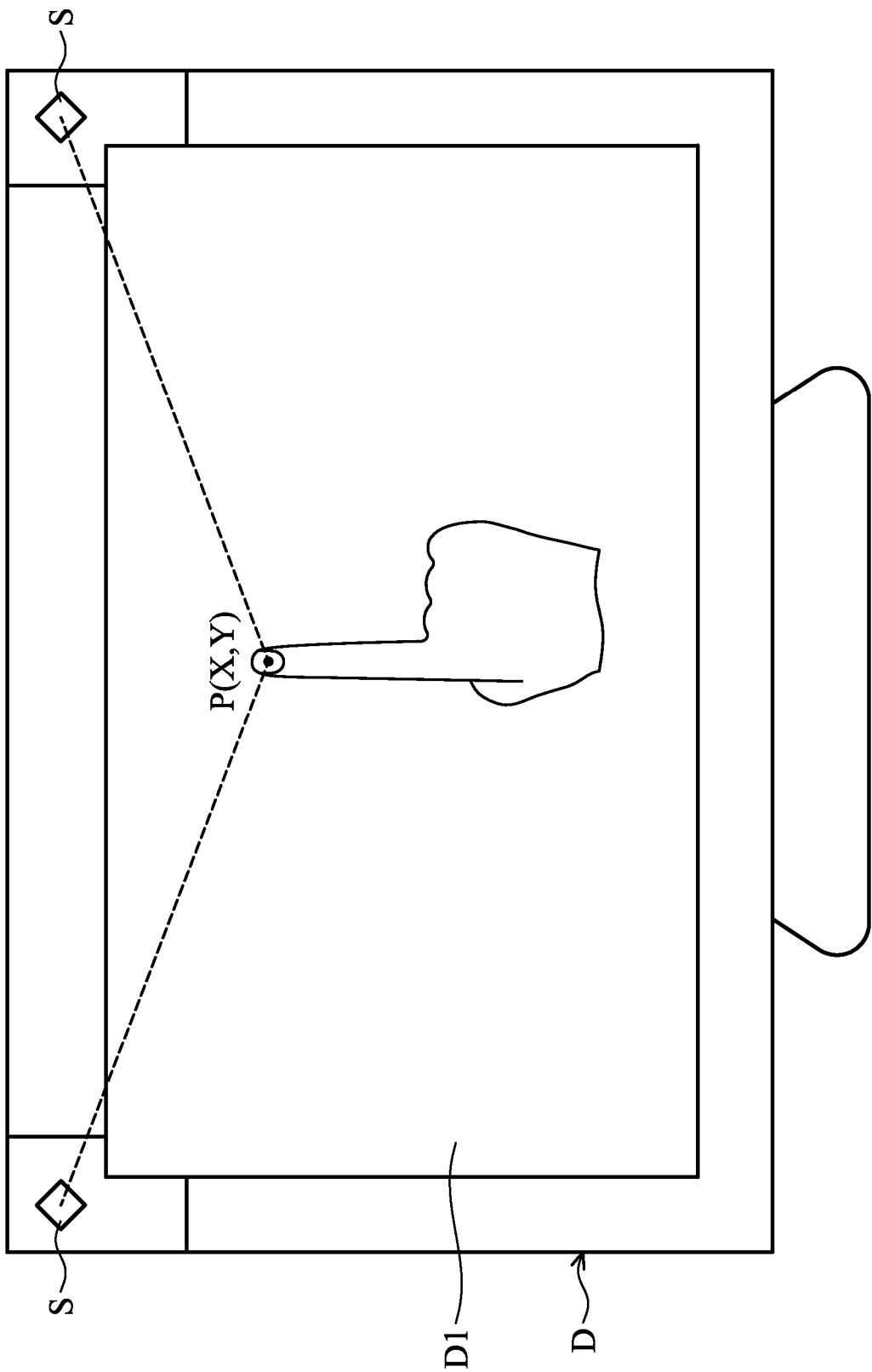
FIG. 1 is a perspective diagram of a conventional optical imaging touch screen.
Figure 2:
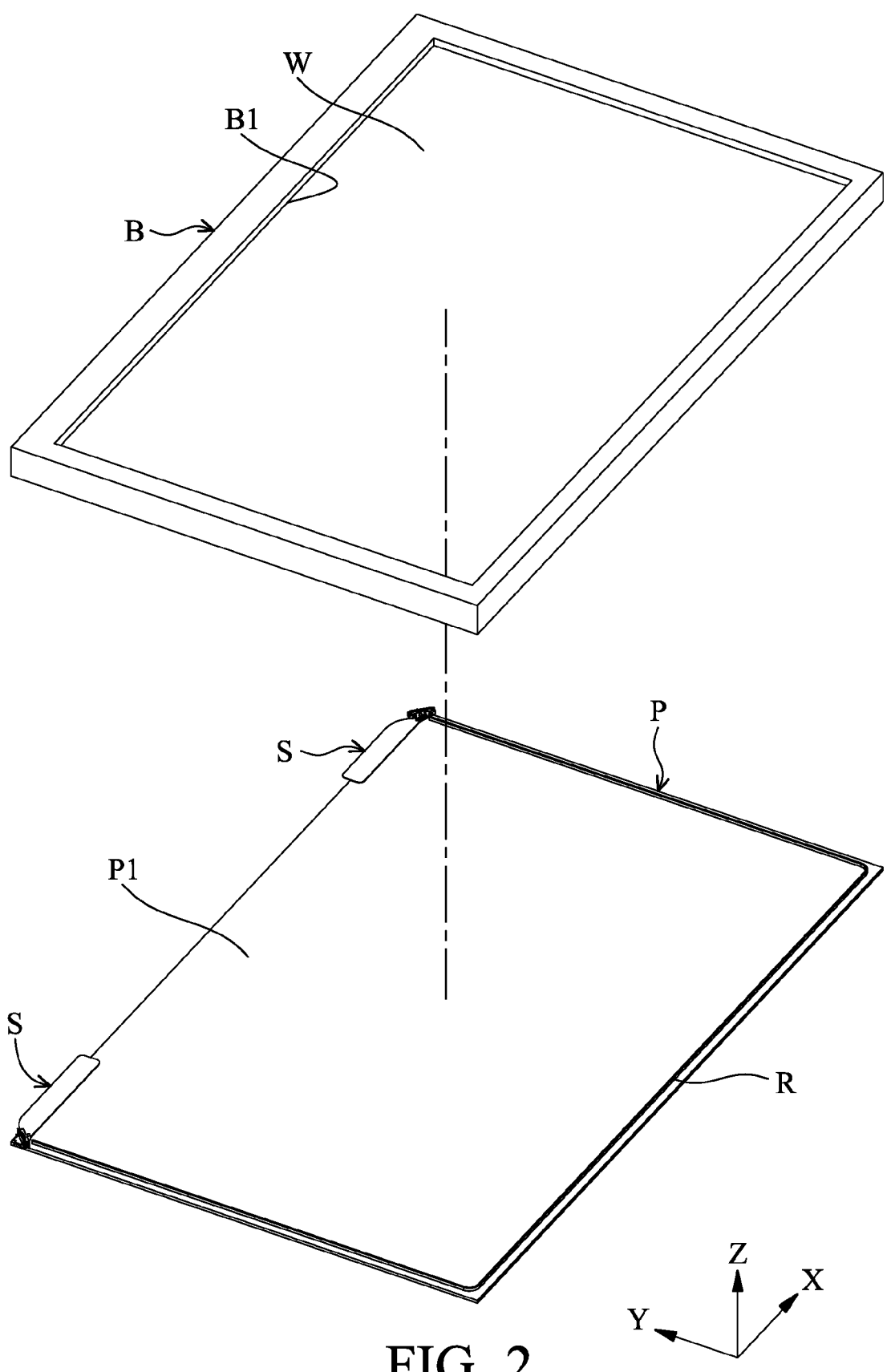
FIG. 2 is a perspective diagram of an optical imaging touch screen according to an embodiment of the invention.

Referring to FIG. 2, an embodiment of an optical imaging touch screen comprises a rectangular panel module P, two image sensor modules S disposed at two adjacent corners of the panel module P, and a rectangular bezel B surrounding the image sensor modules S and the panel module P. As shown in FIG. 2, the panel module P has a display surface P1 substantially parallel to an XY plane and exposed to an opening W of the bezel B. A U-shaped light reflector R is disposed on the panel module P to reflect light emitted from a light source L (FIG. 3A) of the image sensor modules S, such as infrared light, so as to detect objects on the display surface P1.

Figure 3A:
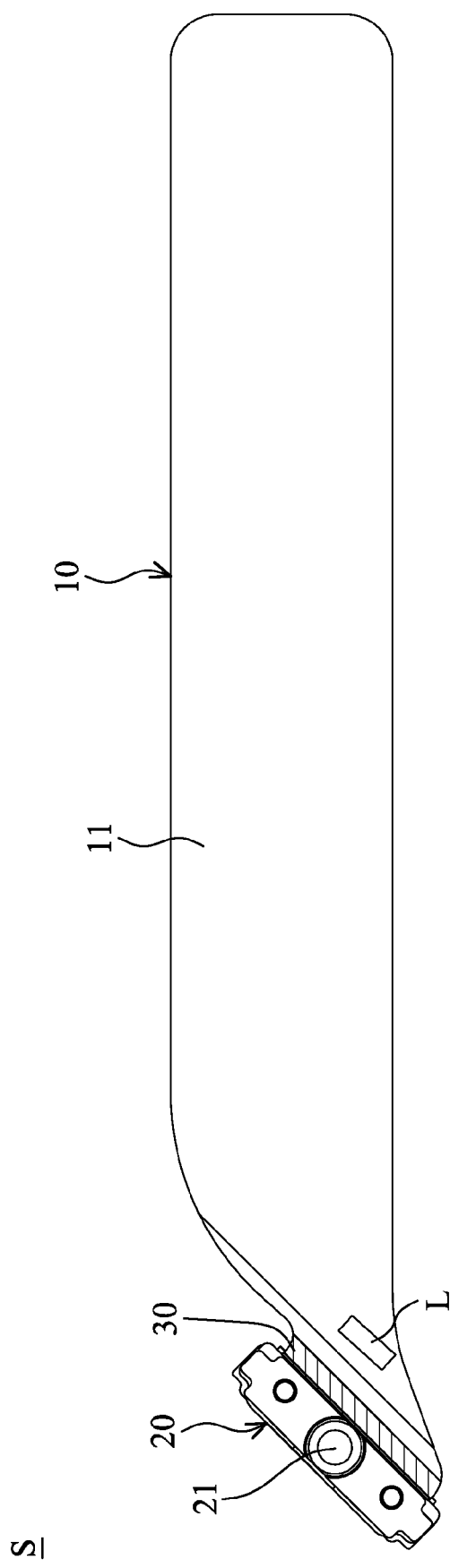
FIGS. 3A and 3B are perspective diagrams of an image sensor module according to an embodiment of the invention.
Figure 3B:
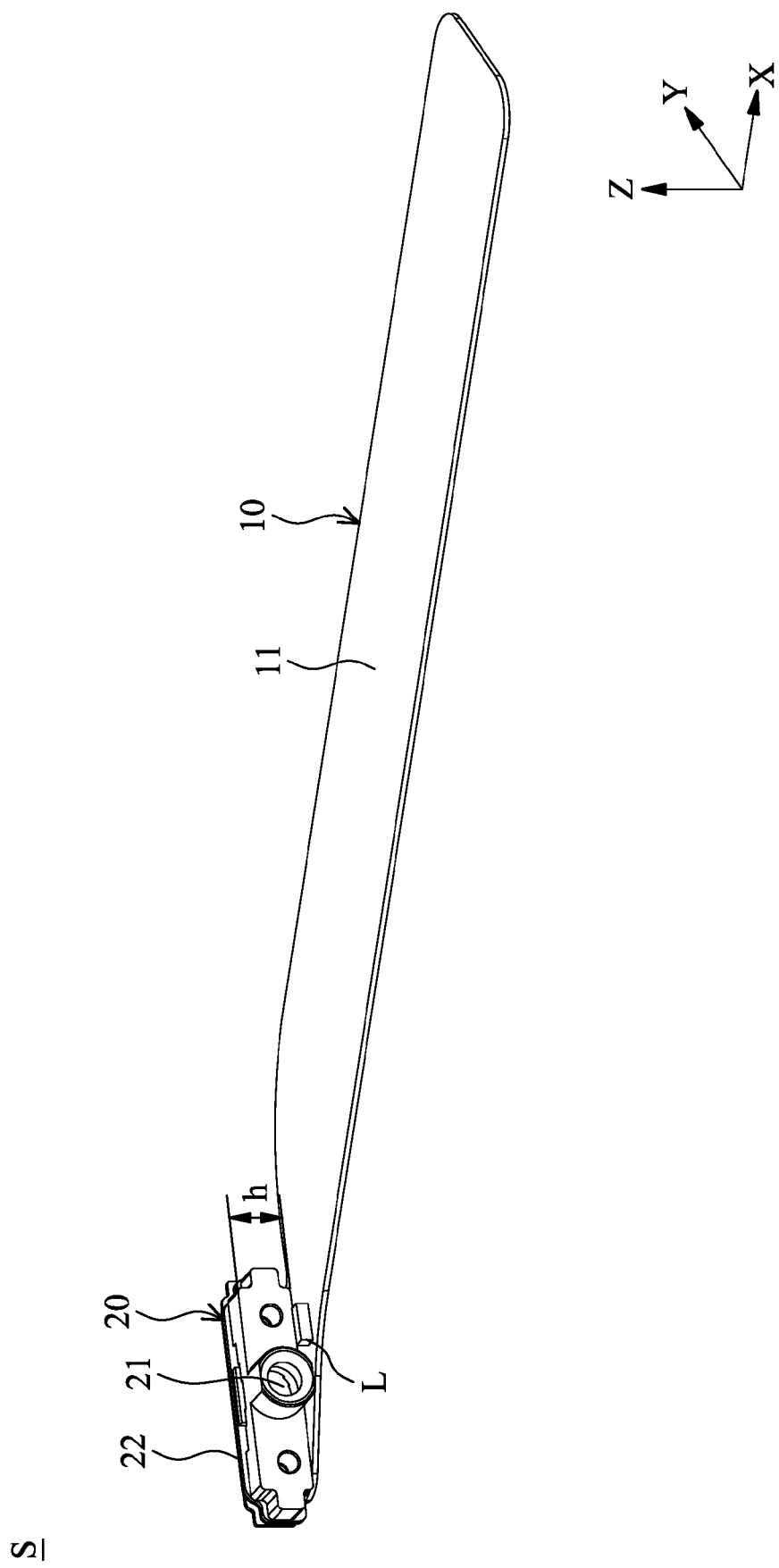

As shown in FIGS. 2, 3A and 3B, the image sensor module S comprises a circuit board 10 mounted on the panel module P, an image sensor unit 20, a light source L disposed on the circuit board 10, and a flexible printed circuit 30 electrically connecting the circuit board 10 with the image sensor unit 20. In this embodiment, the light source L may be an LED emitting light through display surface P1 to the light reflector R, and light is reflected by the light reflector R back to the image sensor unit 20 through the display surface P1 again. The flexible printed circuit 30 is bendable so that the image sensor unit 20 stands erect with respect to the circuit board 10, as shown in FIG. 3B, thus facilitating object detection on the display surface P1.

Referring to FIG. 3B, the circuit board 10 is substantially parallel to the XY plane with the image sensor unit 20 standing thereon, and the image sensor unit 20 has an image sensing surface 21 substantially perpendicular to the XY plane for precise and effective object detection on the display surface P1. In this embodiment, an image sensor array is disposed on the image sensing surface 21 for two-dimensional object detection on the display surface P1.

During assembly, a top portion 22 of the image sensor unit 20 abuts an inner edge B1 of the bezel B, and the circuit board 10 abuts the panel module P, as shown in FIGS. 2 and 3B. Hence, a gap is formed between the inner edge B1 and the circuit board 10, wherein the width of the gap is substantially equal to the height h of the image sensor unit 20 along the Z direction (FIG. 3B). In some embodiments, a wireless module or an antenna may be accommodated in the gap for saving space and reducing dimensions of the touch screen. Additionally, the image sensor module S can also be arranged upside down, wherein the top portion 22 of the image sensor unit 20 abuts the panel module P, and the circuit board 10 abuts the inner edge B1 of the bezel B.

In some embodiments, a line sensor may be applied on the image sensing surface 21 for capturing one-dimensional or linear images of objects on the display surface P1. The line sensor can be directly fixed to the circuit board 10 with the image sensing surface 21 perpendicular to the XY plane to capture images, thus the flexible printed circuit 30 can be omitted for saving space and production cost.

Figure 4:
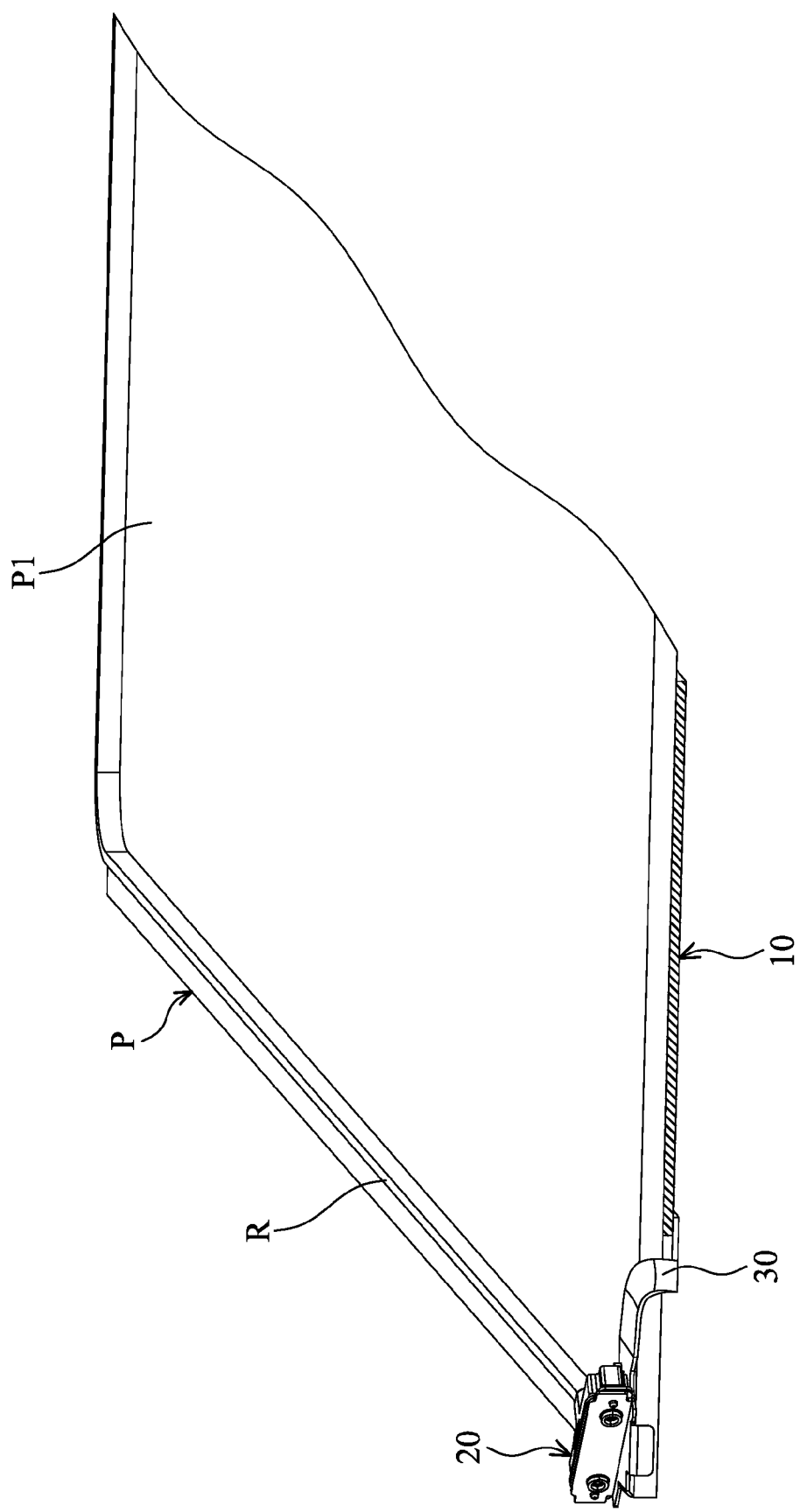
FIG. 4 is a perspective diagram of an optical imaging touch screen according to another embodiment of the invention.

Referring to FIG. 4, another embodiment of a touch screen comprises an image sensor unit 20 and a circuit board 10 respectively disposed on the upper and bottom sides of the panel module P, wherein the image sensor unit 20 and the circuit board 10 are electrically connected by a flexible printed circuit 30, thus improving flexibility for mechanical designs of the touch screen.

The invention provides an optical imaging touch screen comprising a panel module, at least an image sensor module disposed on the panel module, and a bezel surrounding the panel module and the image sensor module. The image sensor module has a circuit board, an image sensor unit electrically connected with the circuit board, and a light source disposed on the circuit board. The image sensor unit has an image sensing surface substantially perpendicular to the circuit board. Thus, the invention could reduce thickness and facilitate miniaturization of the touch screen.

While the invention has been described by way of example and in terms of embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A touch screen, comprising:
   a panel module, comprising a display surface, a rear surface opposite to the display surface and a lateral surface connecting the display surface with the rear surface;
   at least one image sensor module, comprising a circuit board, an image sensor unit and a flexible printed circuit electrically connecting the circuit board with the image sensor unit, wherein the circuit board and the image sensor unit are respectively disposed on the display surface and the rear surface of the panel module, and the image sensor comprises an image sensing surface substantially perpendicular to the circuit board; and
   a bezel, surrounding the panel module, the image sensor module and the flexible printed circuit,
   wherein a top portion of the image sensor unit abuts the bezel, and the circuit board contacts the panel module,
   wherein the flexible printed circuit is extended from the display surface through the lateral surface to the rear surface.

2. The touch screen as claimed in claim 1, wherein the image sensor module further comprises a light source disposed on the circuit board.

3. The touch screen as claimed in claim 2, wherein the light source comprises an LED.

4. The touch screen as claimed in claim 2, wherein the touch screen further comprises a light reflector disposed on the panel module to reflect light from the light source.

5. The touch screen as claimed in claim 4, wherein the light reflector is U-shaped.

6. The touch screen as claimed in claim 1, wherein the bezel and the circuit board form a gap therebetween.

7. The touch screen as claimed in claim 6, wherein the touch screen further comprises a wireless module or an antenna disposed in the gap.

8. The touch screen as claimed in claim 6, wherein the gap has a width substantially equal to a height of the image sensor module along a direction perpendicular to the circuit board.

9. The touch screen as claimed in claim 1, wherein the image sensor unit is fixed to the circuit board.

10. The touch screen as claimed in claim 1, wherein the image sensor unit further comprises a line sensor disposed on the image sensing surface.

11. A touch screen, comprising:
    a panel module, comprising a display surface, a rear surface opposite to the display surface and a lateral surface connecting the display surface with the rear surface;
    two image sensor modules disposed at two adjacent corners of the panel module, wherein each of the image sensor modules comprise a circuit board, an image sensor unit and a flexible printed circuit electrically connecting the circuit board with the image sensor unit, and the circuit board and the image sensor are respectively disposed on the display surface and the rear surface of the panel module, and the image sensor comprises an image sensing surface substantially perpendicular to the circuit board; and
    a bezel, surrounding the panel module, the image sensor modules and the flexible printed circuit,
    wherein a top portion of the image sensor units of the image sensor modules abut the bezel, and the circuit board contacts the panel module,
    wherein the flexible printed circuit is extended from the display surface through the lateral surface to the rear surface.

12. The touch screen as claimed in claim 11, wherein the image sensor module further comprises a light source disposed on the circuit board.

13. The touch screen as claimed in claim 12, wherein the touch screen further comprises a light reflector disposed on the panel module to reflect light from the light source.

* * * * *